United States Patent
Abramson et al.

(10) Patent No.: US 8,160,228 B2
(45) Date of Patent: Apr. 17, 2012

(54) PRIVATE-BRANCH EXCHANGE THAT PROVIDES INCOMING CALLING EXTENDED TO AN OFF-PREMISES TERMINAL IN THE PRESENCE OF A THIRD-PARTY APPLICATION

(75) Inventors: Sandra R. Abramson, Freehold, NJ (US); Stephen M. Milton, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1473 days.

(21) Appl. No.: 11/671,441

(22) Filed: Feb. 5, 2007

(65) Prior Publication Data

US 2008/0187126 A1   Aug. 7, 2008

(51) Int. Cl.
*H04M 3/42* (2006.01)
(52) U.S. Cl. .............................. 379/211.02; 379/212.01
(58) Field of Classification Search ............. 379/211.02, 379/265.01, 142.01, 212.01, 201.01, 142.07; 455/417, 455
See application file for complete search history.

(56) References Cited

U.S. PATENT DOCUMENTS

| | | | |
|---|---|---|---|
| 5,454,033 A | 9/1995 | Hahn et al. | |
| 5,502,762 A | 3/1996 | Andrew et al. | |
| 5,875,234 A | 2/1999 | Clayton et al. | |
| 5,991,390 A * | 11/1999 | Booton | 379/265.02 |
| 6,038,302 A | 3/2000 | Burok et al. | |
| 6,061,438 A | 5/2000 | Shen et al. | |
| 6,950,507 B1 | 9/2005 | Kaplan | |
| 6,993,360 B2 * | 1/2006 | Plahte et al. | 455/555 |
| 7,319,864 B2 * | 1/2008 | Jagadeesan et al. | 455/417 |
| 2003/0185375 A1 | 10/2003 | Albal | |
| 2004/0179660 A1 | 9/2004 | Sammon et al. | |
| 2004/0209640 A1 | 10/2004 | Urban et al. | |
| 2004/0234063 A1 * | 11/2004 | Milton et al. | 379/211.02 |
| 2006/0285671 A1 | 12/2006 | Tiruthani et al. | |

FOREIGN PATENT DOCUMENTS

| | | |
|---|---|---|
| EP | 1679870 A3 | 7/2006 |
| EP | 1814295 A1 | 8/2007 |
| GB | 2422510 A | 7/2006 |

(Continued)

OTHER PUBLICATIONS

Stokes, Jared, "GB Application No. GB0802122.2 Office Action Jan. 18, 2010", , Publisher: UK IPO, Published in: GB.

(Continued)

*Primary Examiner* — Thjuan K Addy
(74) *Attorney, Agent, or Firm* — Maldjian Law Group LLC; John P. Maldjian, Esq.; Alexander D. Walter, Esq.

(57) ABSTRACT

A telecommunications system is disclosed that enables a user to pair a desk set that is an extension of a private-branch exchange with a cell phone that is accessible via the Public Switched Telephone Network. One feature of the telecommunications system enables an incoming call that is directed to the user's desk set to be automatically forwarded to the user's cell phone, while in the presence of third-party call control. This is advantageous to the user because it provides the illusion to the caller that the user is physically in his or her office when she is not necessarily there. The third-party call control can be part of a computer-telephony integration (CTI) application—for example, in a telephone telemarketing center, which handles many incoming telephone calls.

6 Claims, 13 Drawing Sheets

FOREIGN PATENT DOCUMENTS

| | | |
|---|---|---|
| GB | 2446308 A | 8/2008 |
| WO | 97/34437 A1 | 9/1997 |
| WO | 00/59190 A1 | 10/2000 |
| WO | 01/35616 A2 | 5/2001 |
| WO | 0135620 A1 | 5/2001 |
| WO | 2006055221 A2 | 5/2006 |
| WO | 2007109343 A3 | 9/2007 |

OTHER PUBLICATIONS

Stokes, Jared, "International Application No. 0802124.8 Office Action May 15, 2009", , Published in: GB.

Mr. Jared Stokes, "GB Application No. GB0802124.8 Combined Search and Examiners Report", Apr. 28, 2008, Published in: GB.

Le, Karen L., "U.S. Appl. No. 11/671,442 Office Action Nov. 26, 2010", , Publisher: USPTO, Published in: US.

Le, Karen L., "U.S. Appl. No. 11/671,444 Office Action Nov. 26, 2010", , Publisher: USPTO, Published in: US.

Stokes, Jared, "GB Application No. GB0802123.0 Examination Report Oct. 14, 2009", Publisher: UK IPO, Published in: GB.

Stokes, Jared, "GB Application No. GB0802124.8 Examination Report Oct. 13, 2009", Publisher: UK IPO, Published in: GB.

Stokes, Jared, "GB Application No. GB0802122.2 Examination Report Oct. 12, 2009", Publisher: UK IPO, Published in: GB.

Great Britain Application No. GB802123.0, Combined Search and Examination Report date May 1, 2008, Avaya Technology LLC, 5 pages.

U.S. Appl. No. 11/671,444, Office Action dated Nov. 26, 2010, Abramson et al., 30 pages.

Great Britain Application Number No. GB0802122.2, Office Action dated May 13, 2009, Avaya Inc, 2 pages.

Great Britain Application Number No. GB0802122.2, Office Action dated May 27, 2008, Avaya Technology LLC, 5 pages.

\* cited by examiner

Operation Of The Illustrative Embodiment

PRIVATE-BRANCH EXCHANGE THAT PROVIDES INCOMING CALLING EXTENDED TO AN OFF-PREMISES TERMINAL IN THE PRESENCE OF A THIRD-PARTY APPLICATION

FIELD OF THE INVENTION

The present invention relates to telecommunications in general, and, more particularly, to computer-telephony integration.

BACKGROUND OF THE INVENTION

A business that desires to provide employees at one location with telephones has, in general, two options. First, the business can acquire one telephone and one telephone line per employee from the telephone company. Second, the business can acquire one telephone per employee, a small number of telephone lines from the telephone company, and a piece of equipment that enables the employee's telephones to share the small number of telephone lines. In general, the second option is substantially less expensive than the first option, and the piece of equipment that enables the employees' telephones to share the small number of telephone lines is called a "private-branch exchange" or "PBX." Private-branch exchanges are also capable of providing valuable telecommunications features to their users.

SUMMARY OF THE INVENTION

The present invention enables a valuable capability of a telecommunications system. In the prior art, one feature of a telecommunications system enables a user to pair a desk set that is an extension of a private-branch exchange with a cell phone that is accessible via the Public Switched Telephone Network. The feature enables a call that is directed to the user's desk set to be automatically forwarded to the user's cell phone. This is advantageous to the user because it provides the illusion to the caller that the user is physically in her office when she is not necessarily there.

The illustrative embodiment of the present invention also provides the illusion, but does so when a third party initiates a call setup that connects the calling party to the user's cell phone, as the result of an incoming call that is initially directed to the user's desk set. Such a third party includes a computer-telephony integration (CTI) application in a telephone telemarketing center, which handles many incoming telephone calls. In some techniques in the prior art, when a third party was involved with an incoming call from a calling party to a user's desk set, the incoming call would be connected to the desk set only. This would inconvenience the calling party when the user was not at her desk set, in that the call would go unanswered. In some other techniques in the prior art, the incoming call would be forwarded to the cell phone, which would result in the desk set being excluded from the call. This would inconvenience the user (i.e., the called party), in that the user might actually want the call sent to the desk set, instead of or in addition to the cell phone.

Third-party CTI applications are often not inherently integrated with some or all of the features provided by the co-existing private-branch exchanges. The illustrative embodiment enables such CTI applications to interwork with legacy private branch exchanges or other equipment.

The illustrative embodiment comprises receiving a first precursor call from a telephone number T to a telephone number D; allocating, from a pool of ports, a port P that is capable of emulating a telephone extension; and establishing a resultant call between the telephone number T and a telephone number C; wherein the telephone number C is associated with the telephone number D in a data structure; wherein the telephone number D is within the address space of a private-branch exchange; and wherein the resultant call is based on at least one precursor call having been made that includes port P.

DETAILED DESCRIPTION

Figure 1:
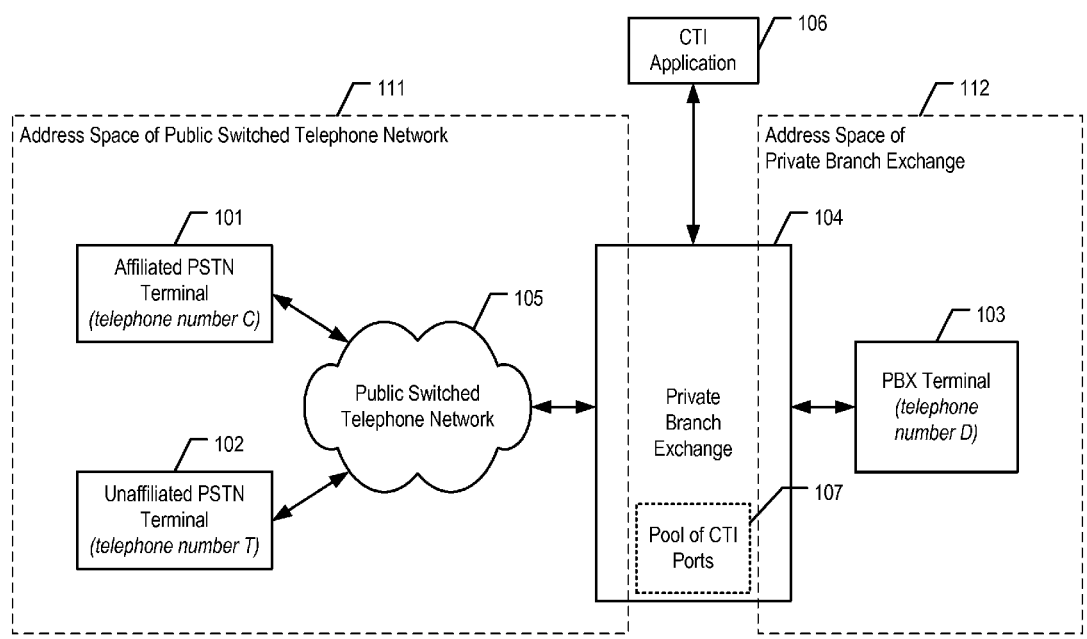
FIG. 1 depicts a schematic diagram of the salient components of telecommunications system 100 in accordance with the illustrative embodiment of the present invention.

Telecommunications System 100—FIG. 1 depicts a schematic diagram of the salient components of telecommunications system 100 in accordance with the illustrative embodiment of the present invention. Telecommunications system 100 comprises affiliated PSTN terminal 101, unaffiliated PSTN terminal 102, private-branch exchange (PBX) terminal 103, private-branch exchange (PBX) telephone system 104, Public Switched Telephone Network 105, and computer-telephony integration (CTI) application 106 interconnected as shown.

Although the illustrative embodiment comprises one affiliated PSTN telecommunications terminal, one unaffiliated PSTN telecommunications terminal, and one PBX telecommunications terminal, it will be clear to those skilled in the art, after reading this disclosure, how to make and use alternative embodiments of the present invention that comprise any number of affiliated PSTN telecommunications terminals, unaffiliated PSTN telecommunications terminals, and PBX telecommunications terminals.

Affiliated PSTN terminal 101 is a telecommunications terminal that corresponds to telephone number C in address space 111 of Public Switched Telephone Network 105. Terminal 101 is off-premises in relation to the on-premises enterprise region served by PBX telephone system 104. It will be clear to those skilled in the art, after reading this specification, how to make and use alternative embodiments of the present invention in which affiliated PSTN terminal 101 corresponds to a telephone number in the address space of a private branch exchange, such as, for example and without limitation, address space 112 of private branch exchange 104. In accordance with the illustrative embodiment, affiliated PSTN terminal 101 is a wireless terminal (e.g., cellular telephone, etc.). It will be clear to those skilled in the art, after reading this disclosure, how to make and use alternative embodiments of the present invention in which affiliated PSTN terminal 101 is a wireline terminal. It will be clear to those skilled in the art how make and use affiliated PSTN terminal 101.

Unaffiliated PSTN terminal 102 is a telecommunications terminal that corresponds to telephone number T in address space 111 of Public Switched Telephone Network 105. It will be clear to those skilled in the art, after reading this disclosure, how to make and use alternative embodiments of the present invention in which unaffiliated PSTN terminal 102 corresponds to a telephone number in the address space of a private branch exchange, such as, for example and without limitation, address space 112 of private branch exchange 104. In accordance with the illustrative embodiment, unaffiliated PSTN terminal 102 is a wireless terminal (e.g., cellular telephone, etc.). It will be clear to those skilled in the art, after reading this disclosure, how to make and use alternative embodiments of the present invention in which unaffiliated PSTN terminal 102 is a wireline terminal. It will be clear to those skilled in the art how to make and use unaffiliated PSTN terminal 102.

PBX terminal 103 is a telecommunications terminal that corresponds to telephone number D in address space 112 of private branch exchange 104. It will be clear to those skilled in the art, after reading this disclosure, how to make and use alternative embodiments of the present invention in which PBX terminal 103 corresponds to a telephone number in address space 111 of the Public Switched Telephone Network or the address space of another private branch exchange. In accordance with the illustrative embodiment, terminal 103 is a wireline terminal. It will be clear to those skilled in the art, after reading this disclosure, how to make and use alternative embodiments of the present invention in which terminal 103 is a wireless terminal. It will be clear to those skilled in the art how to make and use terminal 103.

Private-branch exchange 104 is a switch that provides telecommunications service to PBX terminal 103. Private branch exchange 104 comprises a data structure that associates the telephone number that corresponds to the PBX terminal 103 with the telephone number that corresponds to affiliated terminal 101. An example of such a data structure is depicted in Table 1.

TABLE 1

| Data Structure That Associates the Telephone Number That Corresponds to PBX Terminal 103 with the Telephone Number That Corresponds to Affiliated Terminal 101 ||
|---|---|
| Telephone Number That Corresponds to PBX Terminal 103 | Telephone Number That Corresponds to Affiliated Terminal 101 |
| D | C |

Although the illustrative embodiment associates one pair of telephone numbers, it will be clear to those skilled in the art, after reading this disclosure, how to make and use alternative embodiments of the present invention that associate any number of pairs.

Private-branch exchange 104 further comprises call-resource pool 107, which in turn comprises a plurality of CTI ports. It will be clear to those skilled in the art, after reading this disclosure, how to make and use embodiments of the present invention that comprise any number of CTI ports. Each port P is a logical point of connection that is capable of emulating a telephone extension, at least in the sense that within private-branch exchange 104, a call can be placed to a port, placed from a port, put on hold at a port, or transferred to or from a port. The particular telephone extension that a given port emulates might be known only to CTI application 106 and to private-branch exchange 104 itself, but not necessarily to any other device in system 100. At least one of CTI application 106 and private-branch exchange 104 is able to monitor the busy/idle status of each port P.

As those who are skilled in the art will appreciate, provisioning a greater number of ports will tend to result in a lower blocking level in the handling of calls, but can require additional resources with an associated additional cost. It will be clear to those skilled in the art how to determine an optimal provisioning of ports, for a given blocking level versus cost tradeoff. Additionally, it will be clear to those skilled in the art how to provision and administer the ports of pool 107.

In accordance with the illustrative embodiment, the operation of private-branch exchange 104 and PBX terminal 103 can be directed by computer-telephony integration application 106 in well-known fashion. The details of how to make and use private-branch exchange 104 are described in detail below and in the following drawings.

Public Switched Telephone Network 105 is the public telephone network. It will be clear to those skilled in the art how to make and use Public Switched Telephone Network 105.

Computer-telephony integration (CTI) application 106 is a combination of hardware and software that directs the operation of private-branch exchange 104 and PBX terminal 103. In particular, the CTI application provides the functionality described in detail below and in the accompanying figures. It will be clear to those skilled in the art, after reading this disclosure, how to make and use alternative embodiments of the present invention, in which CTI application 106 is absent and its functionality is performed by private-branch exchange 104 or by a natural person or by a combination of private-branch exchange 104 and by a natural person.

In accordance with the illustrative embodiment, CTI application 106 runs on an independent, general-purpose processor. It will be clear to those skilled in the art, after reading this disclosure, how to make and use alternative embodiments of the present invention in which CTI application 106 runs on an adjunct processor of private-branch exchange 104, a component of one or more of the terminals of telecommunication system 100, or on a special-purpose processor. The details of how to make and use CTI application 106 are described in detail below and in the following drawings.

Figure 2:
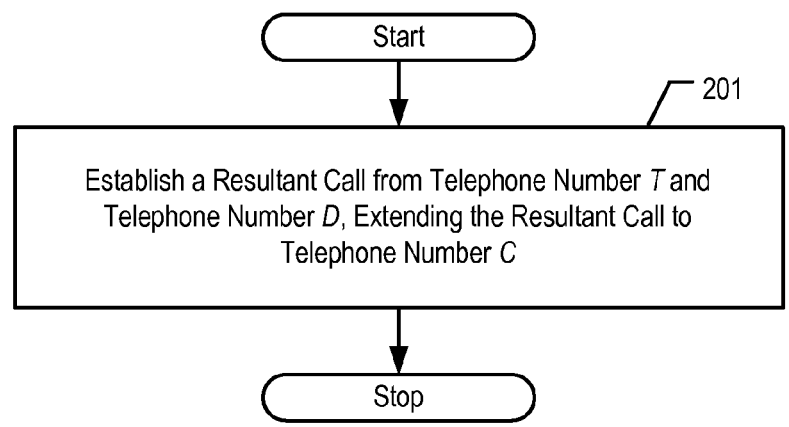
FIG. 2 depicts a flowchart of the salient task performed by the illustrative embodiment of the present invention.

Operation of the Illustrative Embodiment—FIG. 2 depicts a flowchart of the salient task performed by the illustrative embodiment of the present invention.

Task 201 comprises establishing a resultant call from telephone number T to telephone number D while extending the call to telephone number C. The details of how to perform task 201 are described in detail below and with respect to the following drawings.

In some alternative embodiments, an active call that is either incoming or outgoing is established initially between telephone number T and telephone number D, and then sometime later, telephone number C is bridged (e.g., joined, etc.) onto the active call. In those alternative embodiments, the affiliated telecommunications terminal that corresponds to telephone number C can initiate the bridging or the bridging can initiated by other means (e.g., automatically by private-branch exchange 104, etc.). It will be clear to those skilled in the art, after reading this specification, how to apply the techniques of the illustrative embodiment to bridge or transfer, to telephone number C, an already-established, active call that includes telephone numbers T and D (i.e., that has T and D as parties to the call).

Figure 3:
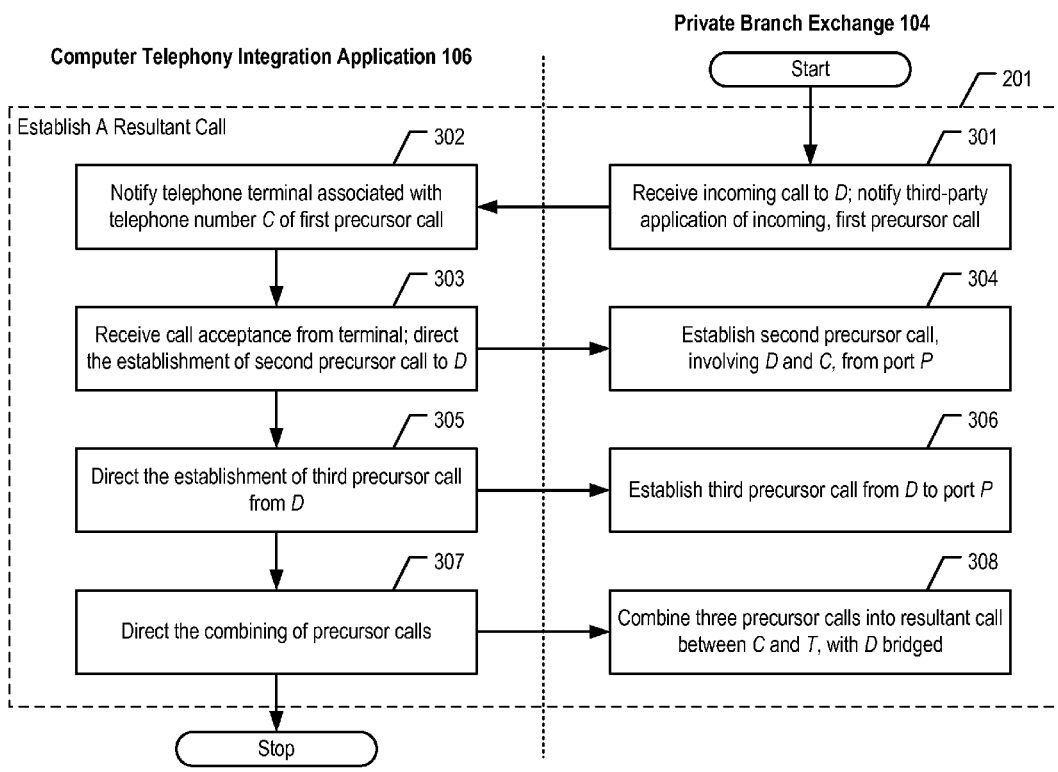
FIG. 3 depicts a flowchart of the salient tasks of task 201 in accordance with the illustrative embodiment of the present invention.

Establish Resultant Call—FIG. 3 depicts a flowchart of the salient tasks of task 201 in accordance with the illustrative embodiment of the present invention.

Figure 4A:
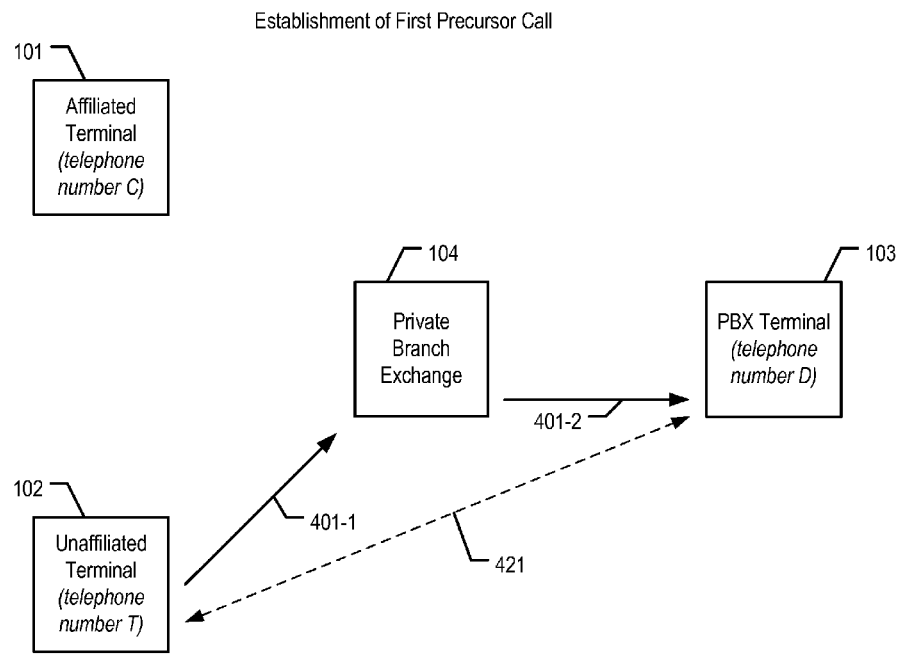
FIGS. 4a, 4b, 4c, and 4d depict graphs of the salient components of the precursor calls and resultant calls.

At task 301, private-branch exchange 104 to receives an incoming, first precursor call from telephone number T to telephone number D and notifies CTI application 106 of the incoming call. FIG. 4a depicts a graph of the salient components of first precursor call 421, which comprises connection 401-1 and connection 401-2. It will be clear to those skilled in the art how to make and use embodiments of the present invention that accomplish task 301.

At task 302, CTI application 106 notifies affiliated PSTN terminal 101 of the incoming call. If terminal 101 accepts the call, the terminal sends back an indication of the call acceptance to CTI application 106. It will be clear to those skilled in the art how to make and use embodiments of the present invention that accomplish task 302.

At task 303, CTI application 106 receives the indication of the call acceptance from terminal 101 and, as a result, directs private-branch exchange 104 to establish a second precursor call to telephone number D from a CTI port, and to enable the extending of the call to the telephone number of the affiliated PSTN terminal (i.e., telephone number C). The details of task 303 are described in detail below and in the accompanying figures.

Figure 4B:
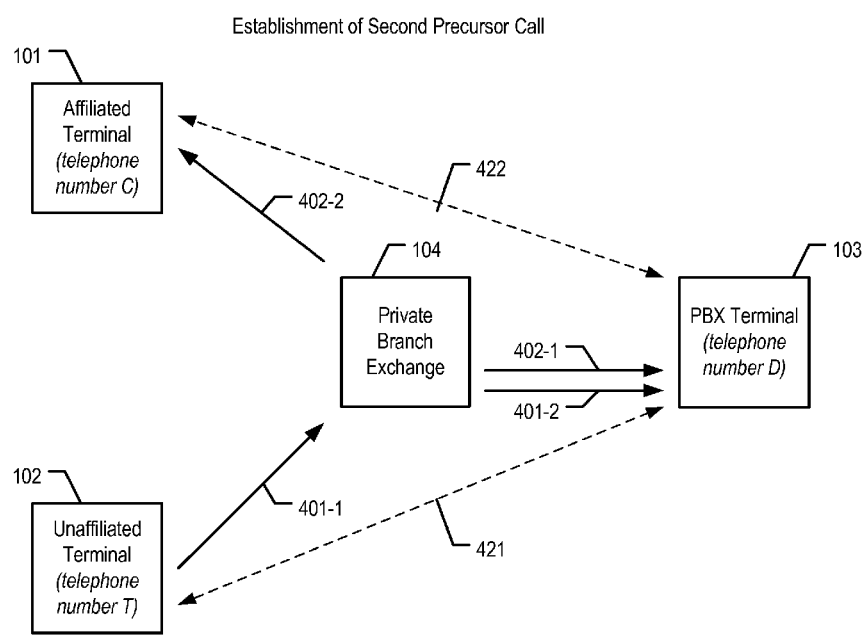

In response to task 303, private-branch exchange 104 establishes at task 304 the second precursor call that includes telephone number D and telephone number C. FIG. 4b depicts a graph of the salient components of first precursor call 421 and second precursor call 422, which comprises connection 402-1 and connection 402-2 from port P. The details of task 304 are described in detail below and in the accompanying figures.

At task 305, CTI application 106 directs private-branch exchange 104 to establish a third precursor call from telephone number D to port P. In accordance with the illustrative embodiment, task 305 is distinct from task 303. It will be clear to those skilled in the art, however, after reading this disclosure, how to make and use alternative embodiments of the present invention in which tasks 303 and 305 are combined or concurrent or performed in the opposite order. It will be clear to those skilled in the art how to make and use embodiments of the present invention that accomplish task 305.

Figure 4C:
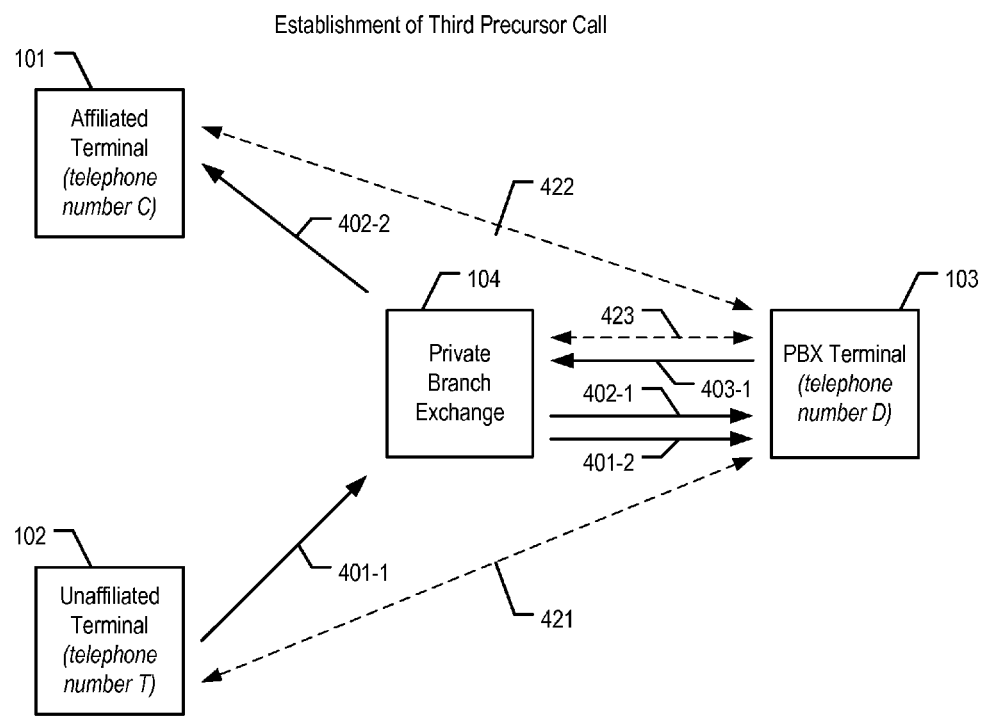

In response to task 305, private-branch exchange 104 establishes at task 306, the third precursor call from telephone number D to port P. FIG. 4c depicts a graph of the salient components of first precursor call 421, second precursor call 422, and third precursor call 423, which comprises connection 403-1. In accordance with the illustrative embodiment, task 304 is performed before task 306. It will be clear to those skilled in the art, after reading this specification, how to make and use alternative embodiments of the present invention in which task 304 and task 306 are performed concurrently or in the opposite order. It will be clear to those skilled in the art how to make and use embodiments of the present invention that accomplish task 306.

At task 307, CTI application 106 directs private-branch exchange 104 to combine all three precursor calls to generate a resultant call between telephone number T and telephone number C while bridging telephone number D to the call. In accordance with the illustrative embodiment, task 307 is distinct from task 303 and task 305. It will be clear to those skilled in the art, after reading this disclosure, how to make and use alternative embodiments of the present invention in which task 303, task 305, and task 307 are combined or concurrent or performed in any order. It will be clear to those skilled in the art how to make and use embodiments of the present invention that accomplish task 307.

Figure 4D:
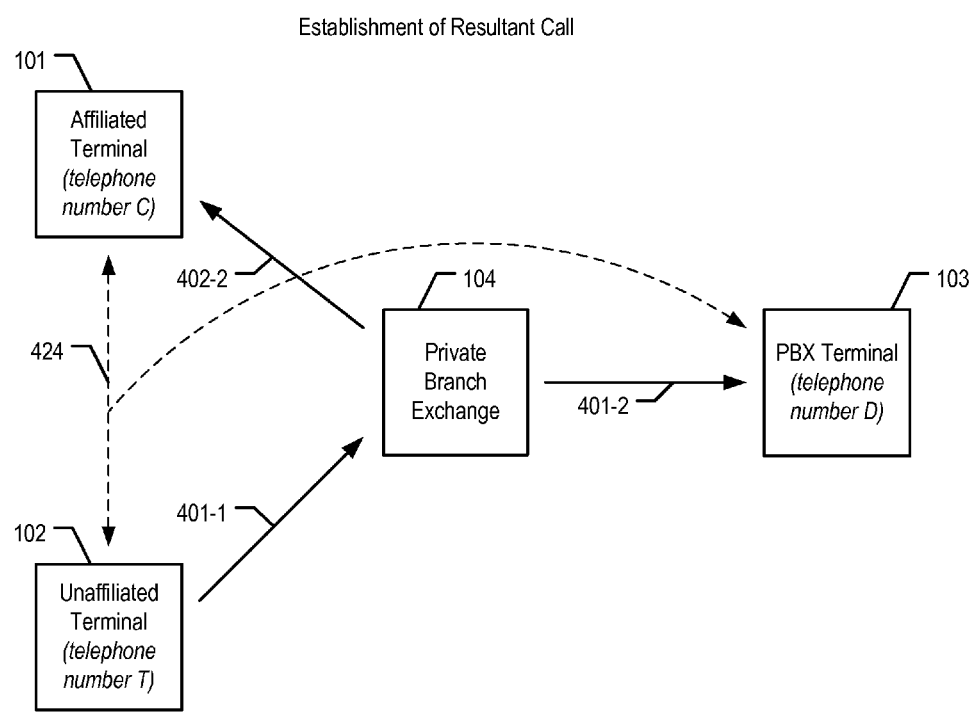

In response to task 307, private-branch exchange 104 combines, at task 308, all three precursor calls to generate the resultant call between telephone number T and telephone number C while bridging telephone number D to the call. In accordance with the illustrative embodiment, the combination of the three precursor calls results in two-party resultant call 424 comprising connections 401-1, 401-2, and 402-2, as depicted in FIG. 4d. Task 306 is described in detail below and in the accompanying figures.

Figure 5:
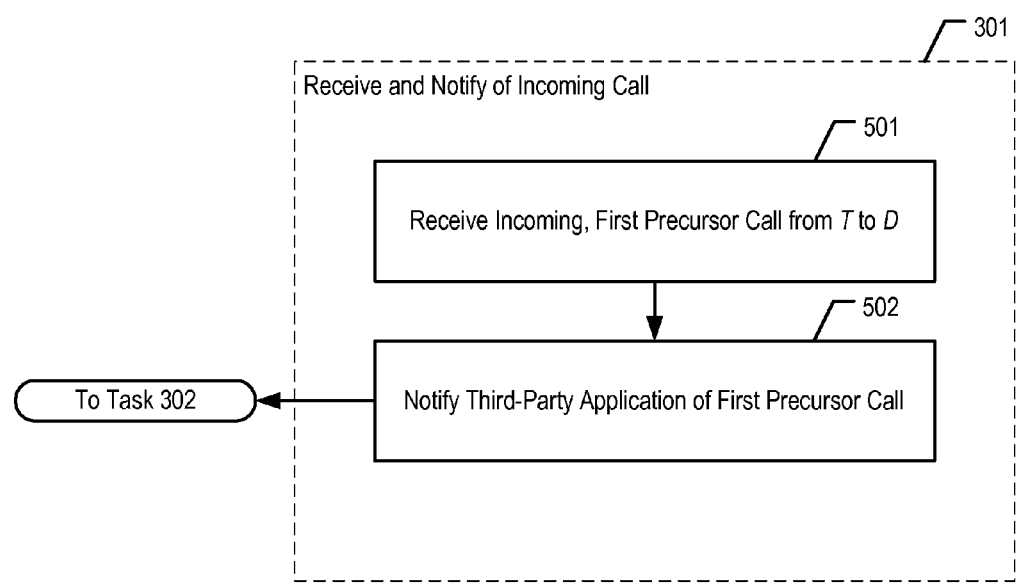
FIG. 5 depicts a flowchart of the salient task performed by the illustrative embodiment in accomplishing task 301.

Arrival of First Precursor Call—FIG. 5 depicts a flowchart of the salient tasks performed by the illustrative embodiment in accomplishing task 301.

At task 501, private branch exchange 104 receives an incoming call from telephone number T and intended for the user of telephone number D. The incoming call is also referred to as the first precursor call.

At task 502, private branch exchange 104, in response to having received the incoming call, notifies CTI application 106 about the call.

Figure 6:
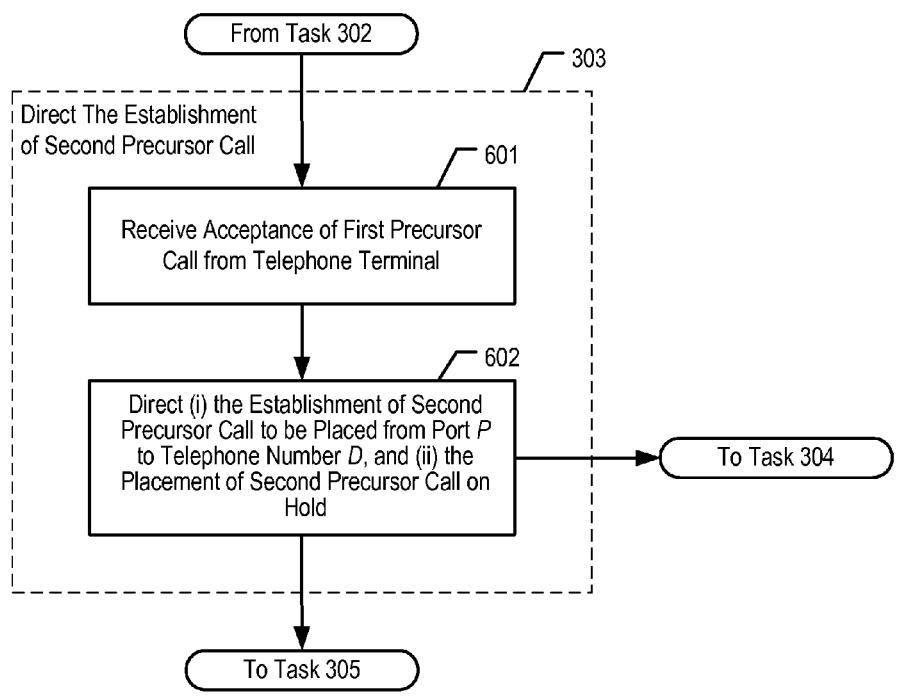
FIG. 6 depicts a flowchart of the salient tasks performed by the illustrative embodiment in accomplishing task 303.

Direct the Establishment of Second Precursor Call—FIG. 6 depicts a flowchart of the salient tasks performed by the illustrative embodiment in accomplishing task 303.

At task 601, CTI application 106 receives an indication of call acceptance from the telecommunications terminal (e.g., terminal 101, etc.) of the user to which the incoming call is intended.

At task 602, CTI application 106 determines that a port from pool 107, namely port P, is available to set up one or more precursor calls. Application 106 directs private-branch exchange 104 to: (i) enable a call made to telephone number D to be extended to the telephone number of the affiliated PSTN terminal (i.e., telephone number C); (ii) establish the second precursor call from selected port P to telephone number D; and (iii) place the second precursor call on hold. It will be clear to those skilled in the art how to make and use embodiments of the present invention that accomplish task 303.

Figure 7:
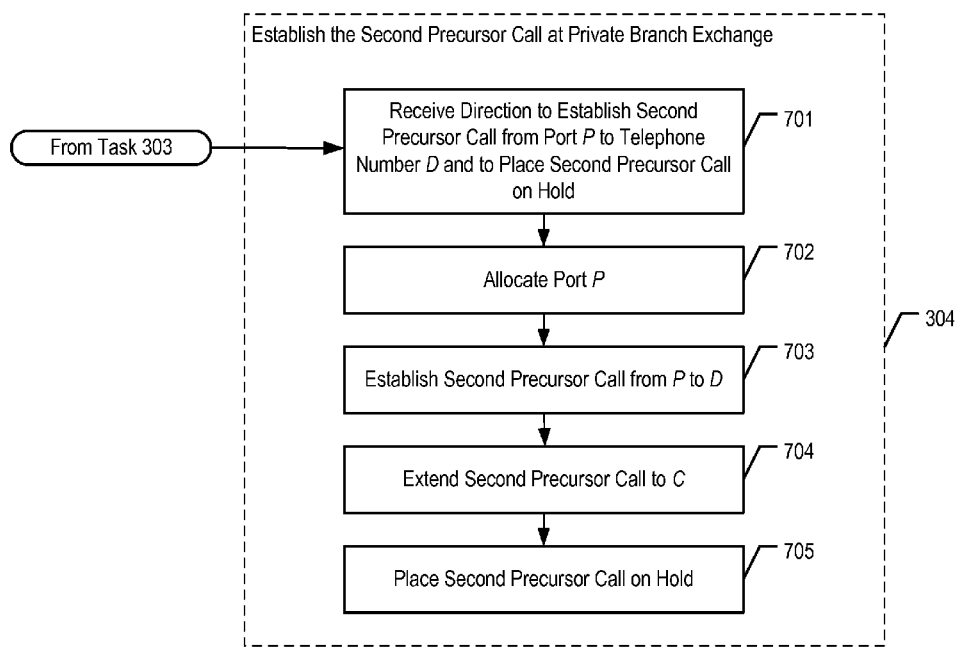
FIG. 7 depicts a flowchart of the salient task performed by the illustrative embodiment in accomplishing task 304.

Establish Second Precursor Call—FIG. 7 depicts a flowchart of the salient tasks performed by the illustrative embodiment in accomplishing task 304.

At task 701, private-branch exchange 104 is directed by CTI application 106 to establish a second precursor call from selected port P to telephone number D and to place the second precursor call on hold. In accordance with the illustrative embodiment, CTI application 106 directs private-branch exchange 104 to establish the second precursor call.

At task 702, private-branch exchange 104 allocates port P to be used for originating the call to telephone number D.

At task 703, private-branch exchange 104 establishes the second precursor call from port P to telephone number D, in well-known fashion.

At task 704, in response to the call to telephone number D, private-branch exchange 104 extends the second precursor call to telephone number C, in well-known fashion.

At task 705, private-branch exchange 104 places the second precursor call on hold, in well-known fashion.

Figure 8:
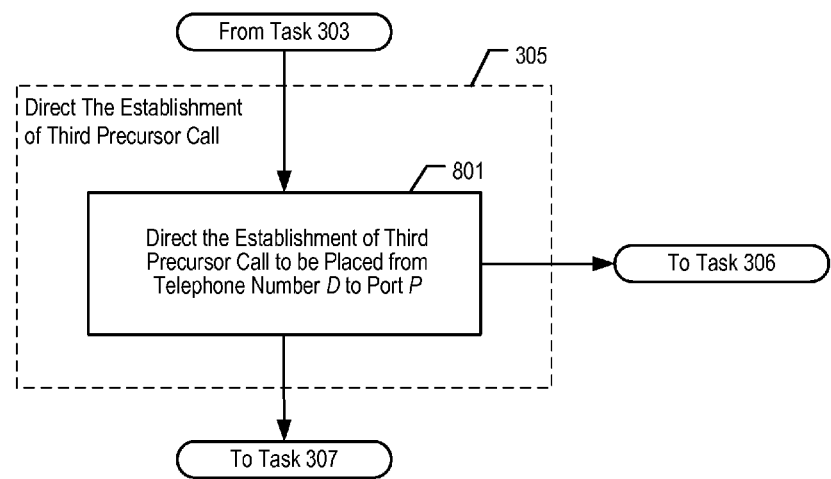
FIG. 8 depicts a flowchart of the salient task performed by the illustrative embodiment in accomplishing task 305.

Direct the Establishment of Third Precursor Call—FIG. 8 depicts a flowchart of the salient tasks performed by the illustrative embodiment in accomplishing task 305.

At task 801, CTI application 106 directs private-branch exchange 104 to establish a third precursor call from telephone number D to port P. It will be clear to those skilled in the art how to make and use embodiments of the present invention that accomplish task 305.

Figure 9:
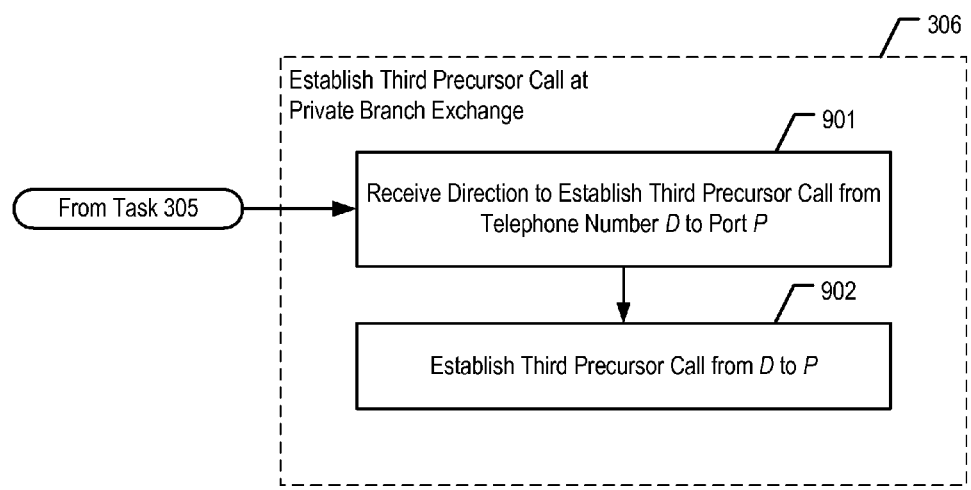
FIG. 9 depicts a flowchart of the salient task performed by the illustrative embodiment in accomplishing task 306.

Establish Third Precursor Call—FIG. 9 depicts a flowchart of the salient tasks performed by the illustrative embodiment in accomplishing task 306.

At task 901, private-branch exchange 104 is directed by CTI application 106 to establish a third precursor call from telephone number D to port P, in accordance with the illustrative embodiment.

At task 902, private-branch exchange 104 establishes the third precursor call from telephone number D to port P, in well-known fashion.

Figure 10:
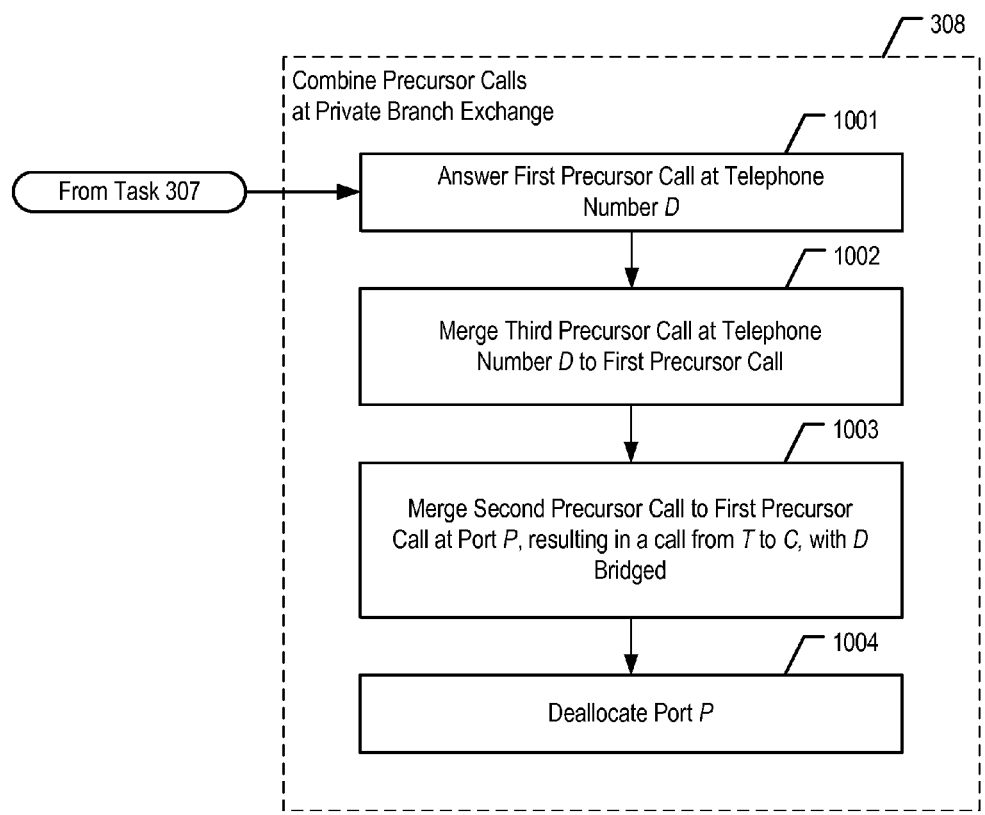
FIG. 10 depicts a flowchart of the salient task performed by the illustrative embodiment in accomplishing task 308.

Combining the Precursor Calls—FIG. 10 depicts a flowchart of the salient task performed by the illustrative embodiment in accomplishing task 308.

At task 1001, private-branch exchange 104 answers the first precursor call (i.e., from telephone number T to telephone number D), in well-known fashion.

At task 1002, private-branch exchange 104 merges the third precursor call (i.e., from telephone number D to port P) with the first precursor call, in well-known fashion.

At task 1003, private-branch exchange 104 merges the second precursor call (i.e., from port P to telephone number D, extended to telephone number C) with the already-merged first precursor call (i.e., between telephone number T and port P), in well-known fashion; the effect of this is to create the resultant call. Exchange 104 then drops port P as a result of the merging.

At task 1004, private-branch exchange 104 deallocates port P, thereby enabling the port to be reused to support future calls that are controlled via CTI application 106.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

What is claimed is:

1. A method comprising:
receiving, at a private branch exchange, a first precursor call from a telephone number T to a telephone number D;
allocating, by an application server, from a pool of ports at the private branch exchange, a port P that is capable of emulating a telephone extension, wherein the extension is known only to the application server and to the private branch exchange; and
establishing a resultant call between the telephone number T and a telephone number C, the resultant call being based on at least one precursor call having been made that includes the port P;
wherein establishing the resultant call comprises:
  (1) establishing a second precursor call from the port P to the telephone number D; and
  (2) establishing a third precursor call from the telephone number D to the port P;
wherein the telephone number C is associated with the telephone number D in a data structure; and
wherein the telephone number D is within an address space of a private branch exchange.

2. The method of claim 1 wherein establishing the resultant call further comprises combining, by the private branch exchange, the first precursor call, the second precursor call, and the third precursor call to generate the resultant call.

3. The method of claim 1 wherein establishing the resultant call comprises directing, by the application server, the private branch exchange to place the second precursor call from the port P to the telephone number D.

4. The method of claim 3 wherein establishing the resultant call comprises extending, by the private branch exchange, the second precursor call to the telephone number C.

5. The method of claim 1 wherein establishing the resultant call further comprises:
directing, by the application server, the private branch exchange to transfer the third precursor call to the first precursor call; and
directing, by the application server, the private branch exchange to transfer the second precursor call the first precursor call to generate the resultant call.

6. A method comprising:
transmitting, by an application server, a notification to a telephone number C of an incoming call to a telephone number D, wherein:
(i) the incoming call is initiated by a telephone number T,
(ii) the telephone number C is associated with the telephone number D, and
(iii) the telephone number D exists within the address space of a private branch exchange;
when telephone number C accepts the incoming call, transmitting from the application server to the private branch exchange, a directive to establish a resultant call that includes the telephone number C, wherein the resultant call results from the incoming call;
originating a first precursor call at the private branch exchange from a port P that is capable of emulating a telephone extension, wherein the first precursor call is directed to the telephone number D, and wherein the extension is known only to the application server and to the private branch exchange;
receiving a second precursor call at the private-branch exchange from the telephone number D that is directed to the port P; and
combining the incoming call, the first precursor call, and the second precursor call to generate the resultant call to the telephone number C; and wherein the telephone number C is within the address space of the Public Switched Telephone Network.

* * * * *